United States Patent
Schmitz et al.

(10) Patent No.: US 8,780,933 B2
(45) Date of Patent: Jul. 15, 2014

(54) METHOD AND APPARATUS FOR AUTOMATED SUBSCRIBER-BASED TDM-IP CONVERSION

(75) Inventors: Peter Bradley Schmitz, Fairfax Station, VA (US); David Owen Corp, Clifton, VA (US)

(73) Assignee: Hubbell Incorporated, Shelton, CT (US)

( * ) Notice: Subject to any disclaimer, the term of this patent is extended or adjusted under 35 U.S.C. 154(b) by 364 days.

(21) Appl. No.: 13/020,255

(22) Filed: Feb. 3, 2011

(65) Prior Publication Data

US 2011/0188514 A1 Aug. 4, 2011

Related U.S. Application Data

(60) Provisional application No. 61/282,411, filed on Feb. 4, 2010.

(51) Int. Cl.
*H04J 3/16* (2006.01)
*H04L 12/28* (2006.01)

(52) U.S. Cl.
USPC ........................................ 370/466; 370/395.5

(58) Field of Classification Search
None
See application file for complete search history.

(56) References Cited

U.S. PATENT DOCUMENTS

| | | | |
|---|---|---|---|
| 6,349,130 B1 | 2/2002 | Posthuma et al. | |
| 6,603,757 B1 | 8/2003 | Locascio | |
| 6,711,742 B1 | 3/2004 | Kishi et al. | |
| 6,731,649 B1 | 5/2004 | Silverman | |
| 7,167,443 B1 | 1/2007 | Dantu et al. | |
| 7,240,123 B2* | 7/2007 | Kamboh et al. | 709/238 |
| 7,428,234 B2 | 9/2008 | Forte-McRobbie et al. | |
| 7,492,761 B1 | 2/2009 | Farr et al. | |
| 7,522,614 B1 | 4/2009 | Aguinaga et al. | |
| 2002/0154646 A1 | 10/2002 | Dubois et al. | |
| 2002/0176403 A1 | 11/2002 | Radian | |
| 2004/0264961 A1 | 12/2004 | Nam et al. | |
| 2005/0111845 A1* | 5/2005 | Nelson et al. | 398/138 |
| 2005/0135387 A1 | 6/2005 | Rychener et al. | |
| 2005/0271059 A1 | 12/2005 | Young et al. | |
| 2006/0133350 A1 | 6/2006 | Lowmaster et al. | |
| 2006/0209886 A1 | 9/2006 | Silberman et al. | |
| 2006/0215553 A1 | 9/2006 | Saitoh | |
| 2006/0219473 A1 | 10/2006 | Boland et al. | |

(Continued)

FOREIGN PATENT DOCUMENTS

KR 20040056382 A 7/2004
KR 20050019266 A 3/2005

*Primary Examiner* — Jutai Kao
(74) *Attorney, Agent, or Firm* — Stacey J. Longanecker; Mark S. Bicks; Alfred N. Goodman

(57) ABSTRACT

An automated conversion method and apparatus are provided to automatically detect the type of an incoming signal (e.g., SONET or Ethernet signal) at a site and to encapsulate outgoing data, or not, based on that detection to facilitate conversion to new infrastructure (e.g., TDM to Ethernet). The automatic detection can be achieved by alternating a search for a SONET signal or Ethernet signal received after a loss of signal or other similar event. Diagnostics of any prior valid transmission are retained in case the disruption was due to transmission quality problem rather than a change in the transmission protocol (i.e. SONET to Ethernet or Ethernet to SONET). The apparatus has an FPGA loaded by a microprocessor with the hardware configuration necessary to support either an IP or SONET configuration when change is detected in the format of the signal arriving at the optical port of the premises device.

19 Claims, 3 Drawing Sheets

(56) References Cited

U.S. PATENT DOCUMENTS

| | | |
|---|---|---|
| 2006/0291400 A1 | 12/2006 | Balasaygun et al. |
| 2007/0127924 A1* | 6/2007 | Tsuritani et al. ............... 398/85 |
| 2008/0013569 A1* | 1/2008 | Boren ........................... 370/466 |
| 2008/0018948 A1 | 1/2008 | Li et al. |
| 2008/0117932 A1 | 5/2008 | Daniel et al. |
| 2008/0159156 A1 | 7/2008 | Takeuchi et al. |
| 2008/0317008 A1 | 12/2008 | Forte-McRobbie et al. |
| 2009/0016719 A1* | 1/2009 | Lee et al. ........................ 398/58 |
| 2009/0022148 A1 | 1/2009 | Anders |
| 2009/0225733 A1 | 9/2009 | Kovacik et al. |
| 2009/0290510 A1 | 11/2009 | Sasaki |

\* cited by examiner

METHOD AND APPARATUS FOR AUTOMATED SUBSCRIBER-BASED TDM-IP CONVERSION

This application claims the benefit of U.S. provisional application Ser. No. 61/282,411, filed Feb. 4, 2010, the entire contents of which are incorporated herein by reference.

BACKGROUND OF THE INVENTION

1. Field of the Invention

The present invention relates generally to automatically migrating TDM-based circuits to IP/Ethernet-based network infrastructure. More specifically, an automated conversion method and apparatus are provided to automatically detect the type of an incoming network signal at a subscriber's premises, a mini-premises, or an external cabinet serving multiple subscribers and to encapsulate outgoing data towards the network, or not, based on that detection to facilitate conversion to new network infrastructure (e.g., TDM to IP) automatically, that is, whenever the network conversion occurs and therefore without having to send technicians to the remote premises at the time of the network conversion to install equipment to support the use of existing TDM circuits with the new infrastructure, thereby saving both travel time and resources as well as the future cost of additional TDM to IP/Ethernet conversion equipment.

2. Description of the Related Art

The public telephone network is migrating from traditional time division multiplexing or TDM-based technology (e.g., T1 or D3 circuits) for circuit mode communications to Ethernet protocol such as internet protocol (IP) technology for packet mode communications. The transformation is made difficult because millions of businesses have standard TDM-based T1 or DS3 circuits. Presently, telecommunications companies and other service providers installing IP infrastructure (e.g., Ethernet) must install TDM to IP conversion equipment during a transition to IP infrastructure to ensure that the needs of subscribers, who are not converting from T1 or DS3 to IP circuits, will continue to be met.

A need therefore exists for a TDM to IP conversion method and apparatus that can be installed at any time at user sites in a synchronous optical network (SONET), and can automatically perform network IP conversion (e.g., conversion to Ethernet) when or if the network conversion from SONET to Ethernet occurs, thereby eliminating the need to deploy technicians to the subscriber or remote user sites to change equipment when the actual TDM to IP conversion occurs and the cost of completely replacing one type of equipment (SONET) with another (Ethernet).

SUMMARY OF THE INVENTION

The above and other problems are overcome, and additional advantages are realized by illustrative embodiments of the present invention.

An apparatus and method are provided to perform an automated transmission protocol conversion at a site that is remote from a central office or other central telecommunications network site such as a Remote Terminal, Hut, Controlled Environment Vault, Mobile Switching Office and so on and hereafter simply referred to as a central office wherein the remote site equipment supports a first transmission protocol. The transmission protocol of an incoming signal to the remote site equipment is determined. An outgoing signal is transmitted from the site equipment in a first transmission protocol if the determined transmission protocol of the incoming signal is the first transmission protocol. Prior to the transmitting, the transmission protocol of the outgoing signal is converted to a second transmission protocol if the determined transmission protocol of the incoming signal is the second transmission protocol.

In accordance with other aspects of illustrative embodiments of the present invention, the first transmission protocol is synchronous optical network or SONET-based, or time division multiplexing or TDM-based, and the second transmission protocol is Ethernet-based. While these two protocols are common, illustrative embodiments of the present invention are applicable to other protocols as well.

In accordance with other aspects of illustrative embodiments of the present invention, the site equipment is configured to receive the incoming signals directed downstream at a site located downstream of the central office and selected from the group consisting of a customer premises, a remote terminal, a mini-premises, a cabinet serving a plurality of customers, and another central office, and to transmit the outgoing signals upstream to the central office from the site.

In accordance with other aspects of illustrative embodiments of the present invention, the site equipment comprises a processing device configured to determine the transmission protocol of the incoming signal automatically at selected times. For example, the determining is performed after a disruption in the incoming signal. Further, diagnostic data can be generated for signals provided to the site equipment, and the diagnostic data corresponding to the incoming signal is retained to differentiate a transmission quality problem from the disruption due to a change in a transmission protocol from SONET-based to Ethernet-based.

In accordance with other aspects of illustrative embodiments of the present invention, the processing device is configured to perform alternating searches for an incoming Ethernet-based signal and an incoming SONET-based signal.

In accordance with other aspects of illustrative embodiments of the present invention, the processing device comprises: a memory device for storing firmware for respective transport carrier formats such as SONET or Ethernet; central processing device programmed to select the firmware corresponding to one of the respective transport carrier formats based on the determined transmission protocol; and a field programmable gate array or similar device; wherein the central processing device loads the selected firmware to the field programmable gate array based on the determined transmission protocol.

BRIEF DESCRIPTION OF THE DRAWINGS

The invention will be more readily understood with reference to the illustrative embodiments thereof illustrated in the attached drawing figures, in which.

DETAILED DESCRIPTION OF ILLUSTRATIVE EMBODIMENTS

Figure 1:
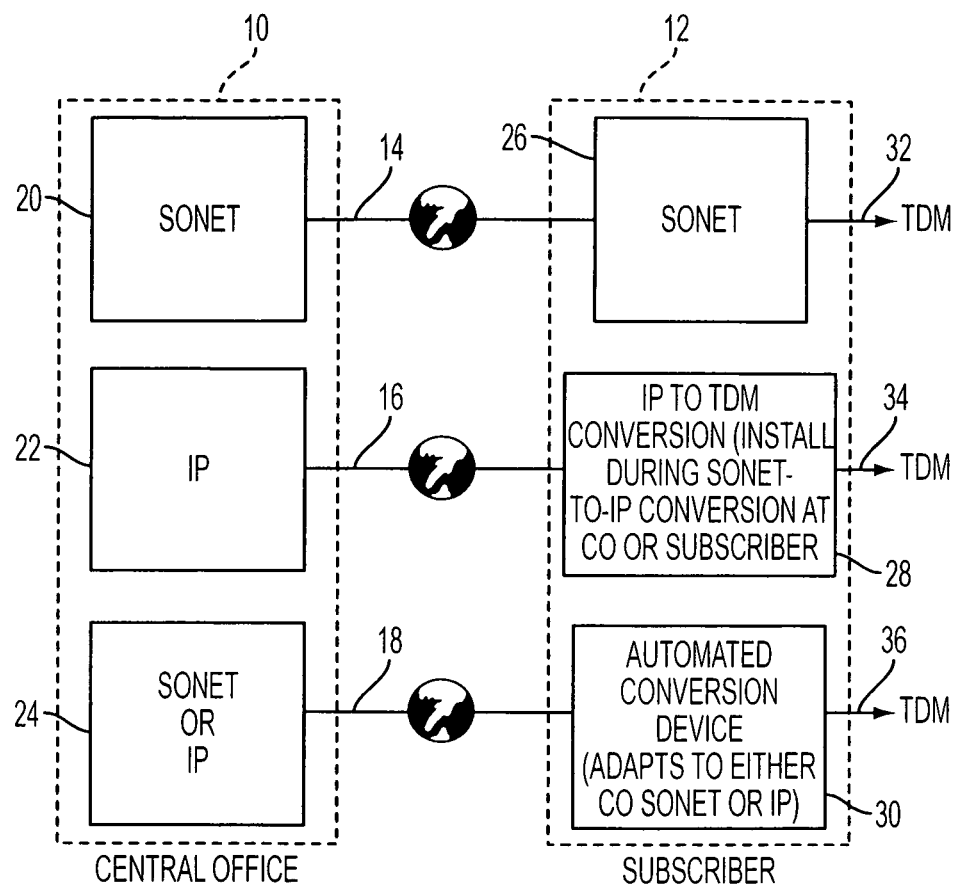
FIG. 1 depicts illustrative equipment at a remote premises or site corresponding to a subscriber, including an automated conversion device in accordance with an illustrative embodiment of the present invention, and a central office.

FIG. 1 depicts a central office (CO) 10 connected to a remote premises 12. In the illustrated embodiment of FIG. 1, the remote premises 12 is a subscriber's premises. It is to be understood that the method and apparatus for automated conversion indicated generally at 30 can also be deployed in remote site equipment at a mini-premises, or an external cabinet serving multiple subscribers, or an unmanned central office, for example, among other locations. Further, the remote premises or site 12 is remote from a central office or other central telecommunications network site such as a Remote Terminal, Hut, Controlled Environment Vault, Mobile Switching Office and so on that is hereafter referred to as a central office.

With continued reference to FIG. 1, the central office 20 can comprise SONET equipment 20 to transport SONET signals via a SONET circuit 14 to and from compatible SONET equipment 26 at the subscriber's premises 12 in a typical manner. The SONET signals can in turn be provided to subscriber premises devices via a TDM link 32. Similarly, the central office 20 can comprise IP equipment 22 to transport IP via an Ethernet circuit 16 to and from compatible equipment 28 at the subscriber's premises 12. For example, IP to TDM conversion equipment 28 is presently installed at the CO or at the subscriber premises during SONET-to-IP conversion to ensure the subscriber premises TDM signals 34 can communicate via Ethernet signals transmitted via the link 16. Presently, the IP to TDM conversion equipment 28 is installed at the time of conversion; therefore, the link 16 is known to be an Ethernet link.

In accordance with an advantage of the present invention, the method and apparatus for automated conversion indicated generally at 30 in FIG. 1 can be deployed at any time (i.e., not necessarily at the time of an infrastructure conversion from TDM to Ethernet circuits), and the type of link 18 (e.g., SONET or Ethernet) need not be known by the remote premises (e.g., terminating equipment in a cabinet) or by remote premises devices (e.g., TDM-based computer equipment or telephone system(s)). Thus, when the method and apparatus for automated conversion 30 are deployed, TDM to Ethernet conversions are simplified for service providers because they do not need to send technicians to remote locations to install the necessary equipment for compatibility between TDM equipment at the remote locations and the new IP infrastructure. This also lowers the service provider's costs. Further, service providers and subscriber's benefit from a relatively low cost, simple solution afforded by deployment of the method and apparatus for automated conversion 30 which leverages additional value from their existing TDM equipment instead of having to invest in new Ethernet equipment before the subscriber intends to.

As described in more detail below in connection with FIG. 2, products that employ the method and/or apparatus for automated conversion 30 are installed at, for example, subscriber sites 12 (FIG. 1) to support standard TDM-based services delivered over fiber optic cable. When a service provider's infrastructure is subsequently changed from TDM to Ethernet, the subscriber-based equipment automatically detects the change and encapsulates TDM-based services into Ethernet packets without the need to travel to subscriber sites, saving cost of both site visits and the cost of TDM to Ethernet conversion equipment at the time of the conversion.

In accordance with illustrative embodiments of the present invention, a subscriber-based device 30 detects the presence of either a SONET signal, such as OC3, or an Ethernet signal, such as Gigabit Ethernet, at its optical port (e.g., indicated generally at 46 in FIG. 2 described below). If the signal is SONET based, the service ports 46 on the device 30 (T1 and/or DS3, for example) are transported as a standard SONET signal, (VT1.5, STS1, etc.). If the device 30 detects an Ethernet signal at its optical ports 46, service port signals are instead encapsulated into Ethernet packets for transport over the optical facility. The automatic detection is achieved by alternating a search for a SONET signal or an Ethernet signal after a loss of signal or similar disruption occurs in the incoming optical link 18. Diagnostics of any prior valid transmission are retained in case the disruption was due to transmission quality problem rather than a change in the transmission protocol (i.e. SONET to Ethernet or Ethernet to SONET).

Because significant real-time processing is preferred for either SONET or Ethernet-based transmission, field programmable gate arrays (FPGAs) or specialized integrated circuits can be used in these applications. To reduce hardware costs in the device 30, a smaller FPGA or similar device can be used that is loaded by a microprocessor with the hardware configuration necessary to support either an Ethernet or SONET configuration when change is detected in the format of the signal arriving at the optical port 46 in accordance with illustrative embodiments of the present invention.

Figure 2:
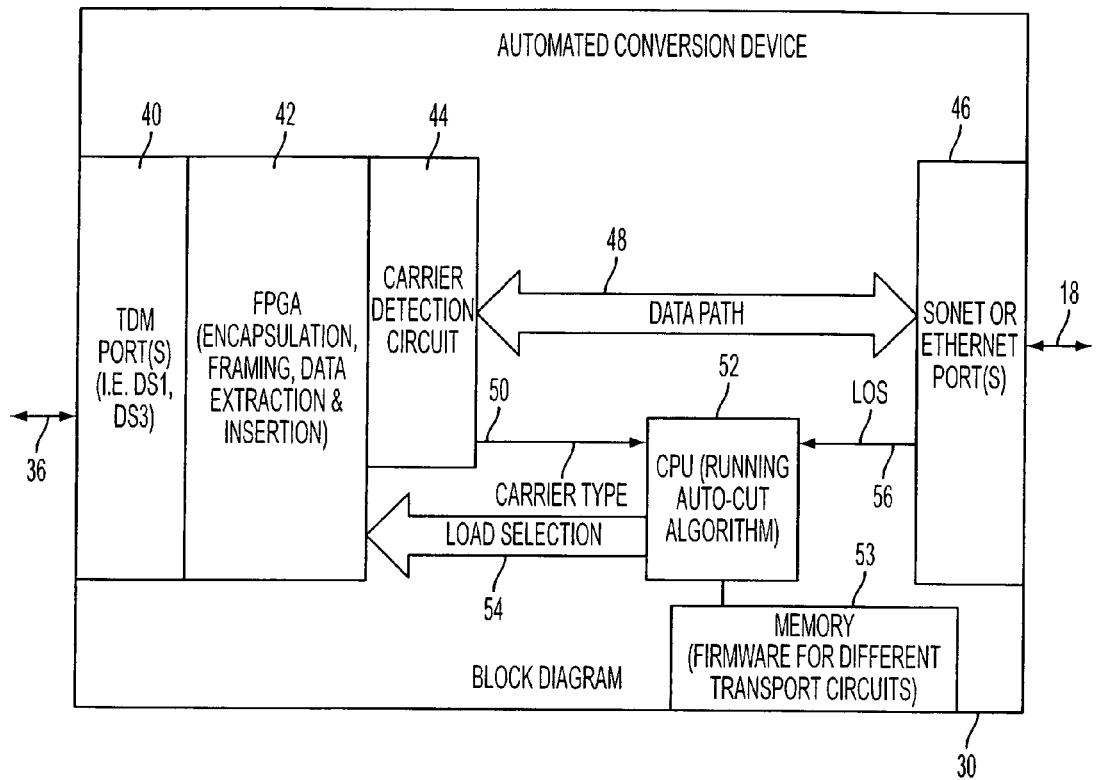
FIG. 2 is a block diagram of an automated conversion device in accordance with an illustrative embodiment of the present invention, and a central office.

The block diagram shown in FIG. 2 shows a device employing automated conversion in accordance with an illustrative embodiment of the present invention. As stated above, the application can be for an environment that may require either Synchronous Optical NETwork (SONET) or Ethernet Carrier access to a Metro Access Network (MAN) or Wide Area Network (WAN) or any other SONET or Ethernet based network. SONET and Ethernet carriers are substantially different in several ways, all of which can be detected by circuits in the device 30. In FIG. 2, a carrier detection circuit 44 is used to determine the type of carrier connected to the device. The carrier detection circuit 44 forwards Carrier Type information indicated at 50 to a central processing unit (CPU) 52 where it is used in a selection algorithm running on the CPU 52. The algorithm is hereinafter referred to as an auto-cut algorithm since it enables the device 30 to automatically encapsulate and return data on an Ethernet carrier or link, a SONET link, or more generally, a link with other transport format.

With continued reference to FIG. 2, the CPU 52 issues a load selection output to a Field Programmable Gate Array (FPGA) 42 based on the carrier type detected. The CPU 52 loads the FPGA 42 with firmware that configures the FPGA to operate as required for connection of Time Division Multiplexed (TDM) Ports 40 to the detected carrier type (e.g., transport format supported by carrier 18) to support the data path 48. This same technique can be used to connect Ethernet or any other transport format to SONET or Ethernet and so on.

Figure 3:
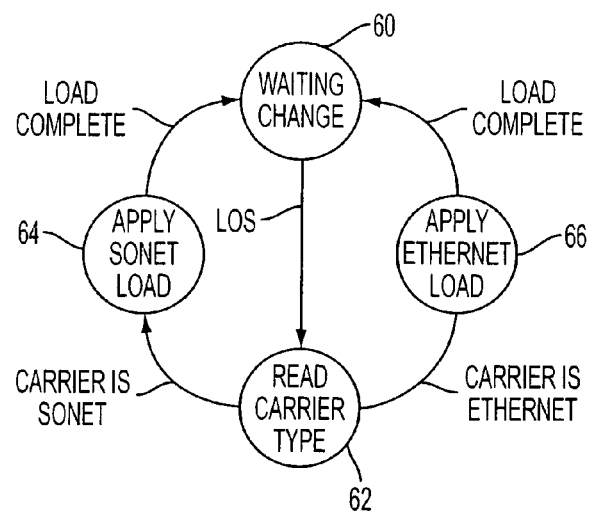
FIG. 3 is a flow chart of illustrative processes performed by an automated conversion device in accordance with an illustrative embodiment of the present invention.

The auto-cut algorithm employed by the CPU 52 will now be described in more detail with reference to FIG. 3. The diagram in FIG. 3 depicts at a high level the auto-cut algorithm used to select the appropriate Carrier Firmware to be loaded into the FPGA 42. The CPU 52 and/or associated memory 53 can store respective firmware for carriers of different transport formats, one of which is selectively loaded into the FPGA 42 based on the detected carrier type. In accordance with the auto-cut algorithm, the CPU 52 waits for a change (step 60) such as a Loss Of Signal (LOS) as indicated at 56 in FIG. 2. A LOS starts a query by the CPU 52 for the Carrier Type 50 as indicated by the carrier detection hardware 44 (step 62). Based on the carrier type, the auto-cut software or algorithm in the CPU 52 will control the CPU to then load the FPGA with appropriate firmware to operate as required for connection of TDM Ports 40 to the detected carrier type (step 64 or 66). When the load is complete, the algorithm returns to wait for another change to occur.

The CPU 52 and auto-cut algorithm described herein take advantage of the configurable nature of FPGAs to allow a single product to work with and automatically distinguish between at least two of, for example, the most common carrier technologies currently in place, thus reducing the number of devices required to suit differing networks and eliminating the need to upgrade remote locations when the carrier type changes.

In accordance with another advantageous aspect of exemplary embodiments of the present invention, a facility failure (e.g., a cut or otherwise damaged fiber cable), the method and apparatus of automated conversion 30 configures the CPU 52 to maintain the performance of the service prior to the failure in memory so that it can be retrieved from memory once service is restored, even if the restoration includes a change from Ethernet to SONET or SONET to Ethernet.

The advantages of the method and apparatus of automated conversion 30 in accordance with illustrative embodiments of the present invention are significant. First, service vehicle or truck deployment can be avoided by deploying the technology at subscriber or remote user sites in a SONET network. When a network transition to Ethernet occurs, there is no need to travel to the remote sites to change equipment because the equipment can detect and change its operating mode automatically. Another advantage is the ability to use a smaller and less expensive FPGA 42 because the FPGA 42 must contain only SONET or only Ethernet circuitry (or other transport circuit supported in firmware) at one time. After a transition of Carrier Type, the FPGA is loaded with the appropriate code as described above.

Apparatus and methods are provided to perform an automated transmission protocol conversion at a site that is remote from a central office or other central telecommunications network site such as a Remote Terminal, Hut, Controlled Environment Vault, Mobile Switching Office and so on and hereafter simply referred to as a central office wherein the remote site equipment supports a first transmission protocol.

Figure 4:
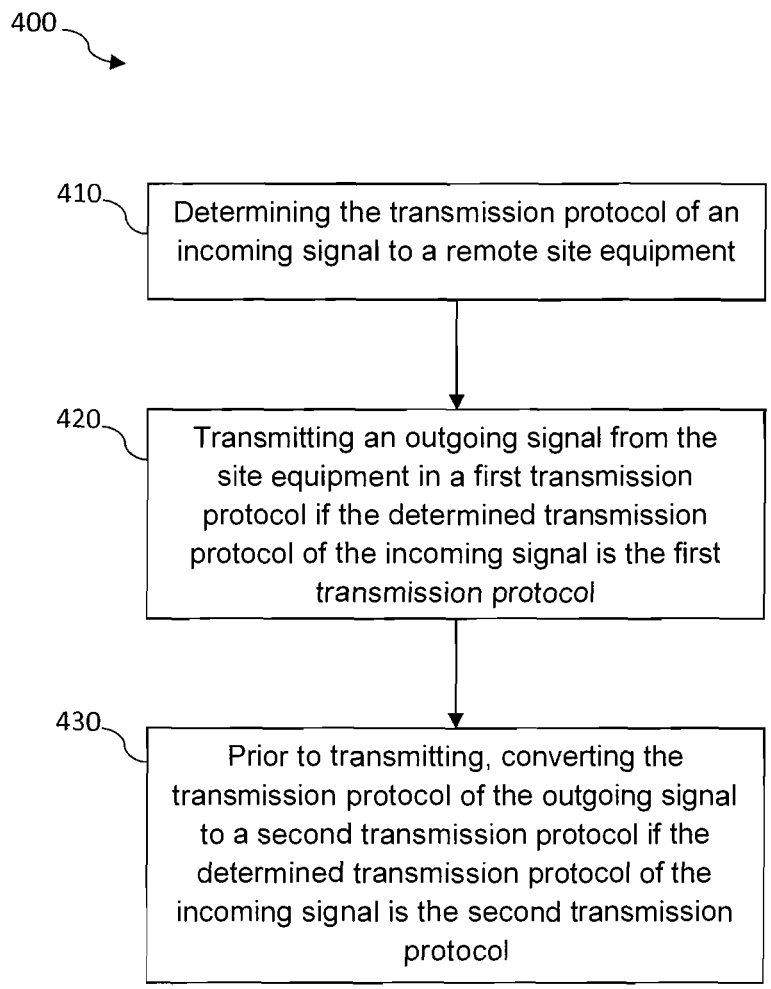
FIG. 4 is a flow chart of an illustrative method of performing an automated transmission protocol conversion.

FIG. 4 is a flow chart of an illustrative method of performing an automated transmission protocol conversion at a site that is remote from a central office or other site wherein the remote site equipment supports a first transmission protocol. The transmission protocol of an incoming signal to the remote site equipment is determined at step 410. An outgoing signal is transmitted from the site equipment in a first transmission protocol if the determined transmission protocol of the incoming signal is the first transmission protocol at step 420. Prior to the transmitting, the transmission protocol of the outgoing signal is converted to a second transmission protocol if the determined transmission protocol of the incoming signal is the second transmission protocol at step 430.

Illustrative embodiments of the present invention have been described with reference to a CPU 52 having firmware and an auto-cut algorithm as described with reference to FIGS. 2 and 3, and a FPGA 42. It is to be understood, however, that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the invention herein disclosed has been described by means of specific embodiments and applications thereof, numerous modifications and variations can be made thereto by those skilled in the art without departing from the scope of the invention.

What is claimed is:

1. A method of performing an automated transmission protocol conversion at a site that is remote from a central office or other site wherein the remote site equipment is connected to the central office or other site by a first carrier type that supports a first transmission protocol comprising:

storing first firmware for connecting at least one port at the remote site to the first carrier type that supports the first transmission protocol, and second firmware for connecting the at least one port at the remote site to a second carrier type that supports a second transmission protocol, in a memory accessed by the remote site equipment;

operating the remote site equipment in accordance with the first firmware and transmitting outgoing signals from the remote site equipment in the first transmission protocol in accordance with the first firmware;

determining if the transmission protocol of an incoming signal to the remote site equipment has transitioned to the second transmission protocol following the connection of the at least one port to the second carrier type instead of the first carrier type; and reconfiguring the remote site equipment to operate in accordance with the second firmware instead of the first firmware to convert, prior to the transmitting, the transmission protocol of the outgoing signal to the second transmission protocol when the determined transmission protocol of the incoming signal is the second transmission protocol, and to continue operating the remote site equipment in accordance with the second firmware instead of the first firmware thereafter to transmit any subsequent outgoing signals in the second transmission protocol;

wherein the remote site equipment comprises a processing device operating in accordance with the first firmware; and wherein reconfiguring comprises loading the processing device with the second firmware in place of the first firmware to control the processing device such that the processing device supports only the second carrier type and requires reloading the processing device with different firmware if the determined transmission protocol of an incoming signal changes from the second transmission protocol supported by the second firmware.

2. The method as claimed in claim 1, wherein the first transmission protocol is synchronous optical network or SONET-based.

3. The method as claimed in claim 1, wherein the first transmission protocol is time division multiplexing or TDM-based.

4. The method as claimed in claim 1, wherein the second transmission protocol is Ethernet-based.

5. The method as claimed in claim 1, wherein the site is selected from the group consisting of a customer premises, a remote terminal, a mini-premises, a cabinet serving a plurality of customers, and another central office.

6. A method as claimed in claim 1, wherein the determining is performed automatically at selected times or events.

7. A method as claimed in claim 1, wherein the determining comprises performing alternating searches for an incoming first transmission protocol-based signal and an incoming second transmission protocol-based signal.

8. A method as claimed in claim 7, wherein the determining is performed after a disruption in the incoming signal.

9. A method of performing an automated transmission protocol conversion at a site that is remote from a central office or other site wherein the remote site equipment supports a first transmission protocol comprising:
   determining the transmission protocol of an incoming signal to the remote site equipment;
   transmitting an outgoing signal from the remote site equipment in the first transmission protocol if the determined transmission protocol of the incoming signal is the first transmission protocol; and
   converting, prior to the transmitting, the transmission protocol of the outgoing signal to a second transmission protocol if the determined transmission protocol of the incoming signal is the second transmission protocol;
   wherein the determining comprises performing alternating searches for an incoming first transmission protocol-based signal and an incoming second transmission protocol-based signal after a disruption in the incoming signal; and
   wherein diagnostic data is generated for signals provided to the site equipment, and the diagnostic data corresponding to the incoming signal is retained to differentiate a transmission quality problem from the disruption due to a change in a transmission protocol and to be available if the disruption was not due to a change in a transmission protocol.

10. An apparatus configured to perform an automated transmission protocol conversion at a site that is remote from a central office or other site wherein the apparatus is connected to the central office or other site by a first carrier type that supports a first transmission protocol comprising:
   a memory device for storing first firmware for connecting at least one port at the remote site to the first carrier type that supports the first transmission protocol, and second firmware for connecting the at least one port at the remote site to a second carrier type that supports a second transmission protocol, in a memory accessed by the remote site equipment;
   a processing device configured to operate the apparatus in accordance with the first firmware; and
   a transmitting/receiving interface for transmitting outgoing signals from the apparatus in the first transmission protocol in accordance with the first firmware;
   wherein the apparatus, upon receiving an indication that the transmission protocol of an incoming signal to the remote site is the second transmission protocol, reconfigures the processing device to operate in accordance with the second firmware instead of the first firmware to convert, prior to the transmitting, the transmission protocol of an outgoing signal corresponding to the input signal to the second transmission protocol, and to continue operating the apparatus in accordance with the second firmware instead of the first firmware thereafter to transmit any subsequent outgoing signals in the second transmission protocol;
   wherein the processing device is loaded with the second firmware in place of the first firmware such that the processing device is controlled to support only the second carrier type and requires reloading with different firmware if the determined transmission protocol of an incoming signal changes from the second transmission protocol supported by the second firmware.

11. An apparatus as claimed in claim 10, wherein the first transmission protocol is synchronous optical network or SONET-based.

12. An apparatus as claimed in claim 10, wherein the first transmission protocol is time division multiplexing or TDM-based.

13. An apparatus as claimed in claim 10, wherein the second transmission protocol is Ethernet-based.

14. An apparatus as claimed in claim 10, wherein the apparatus is configured to receive the incoming signals directed downstream at a site located downstream of the central office or similar site and selected from the group consisting of a customer premises, a remote terminal, a mini-premises, a cabinet serving a plurality of customers, and another central office, and to transmit the outgoing signals upstream to the originating central office from the remote site.

15. An apparatus as claimed in claim 10, wherein at least one of the processing device and a remote site equipment component is configured to determine the transmission protocol of the incoming signal automatically at selected times or events.

16. An apparatus as claimed in claim 10, wherein at least one of the processing device and a remote site equipment component is configured to perform alternating searches for an incoming first transmission protocol-based signal and an incoming second transmission protocol-based signal.

17. An apparatus as claimed in claim 16, wherein the determining is performed after a disruption in the incoming signal.

18. An apparatus configured to perform an automated transmission protocol conversion at a site that is remote from a central office or other site wherein the apparatus supports a first transmission protocol comprising:
   a processing device configured to determine the transmission protocol of an incoming signal to the remote site equipment by performing alternating searches for an incoming first transmission protocol-based signal and an incoming second transmission protocol-based signal after a disruption in the incoming signal; and
   a transmitting/receiving interface for transmitting an outgoing signal from the apparatus in the first transmission protocol if the determined transmission protocol of the incoming signal is the first transmission protocol;
   wherein the processing device is further configured to convert, prior to the transmitting, the transmission protocol of the outgoing signal corresponding to the input signal to a second transmission protocol when the determined transmission protocol of the incoming signal is the second transmission protocol; and
   wherein diagnostic data is generated for signals provided to the apparatus, and the diagnostic data corresponding to the incoming signal is retained to differentiate a transmission quality problem from the disruption due to a change in a transmission protocol and to be available if the disruption was not due to a change in a transmission protocol.

19. An apparatus configured to perform an automated transmission protocol conversion at a site that is remote from a central office or other site wherein the apparatus supports a first transmission protocol comprising:
- a processing device configured to determine the transmission protocol of an incoming signal to the remote site equipment; and
- a transmitting/receiving interface for transmitting outgoing signals from the apparatus in the first transmission protocol;
- wherein the processing device is further configured to convert, prior to the transmitting, the transmission protocol of the outgoing signal corresponding to the input signal to a second transmission protocol when the determined transmission protocol of the incoming signal is the second transmission protocol, and
- wherein the processing device comprises:
- a memory device for storing respective firmware for different transport carrier formats, each of the firmware, when selected, configures the apparatus to operate using its corresponding one of the different transport carrier formats;
- processing device being programmed to select the firmware corresponding to one of the different transport carrier formats based on the determined transmission protocol; and
- a field programmable gate array loaded with first firmware corresponding to the first transmission protocol, the processing device being configured to load the selected firmware for the second transmission protocol to the field programmable gate array in place of the first firmware based on the determined transmission protocol such that the field programmable gate array comprises only the selected firmware for the second transmission protocol.

* * * * *